May 3, 1960 F. O. WISMAN 2,935,091
SOLENOID VALVE
Filed July 16, 1956
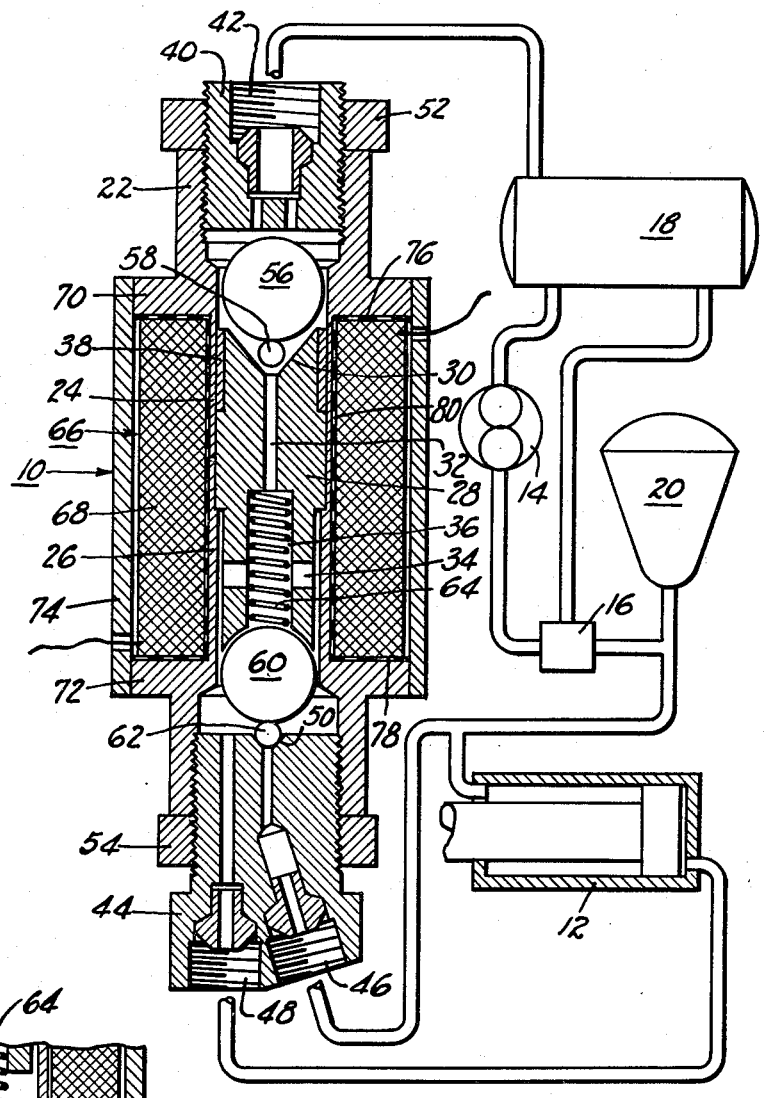
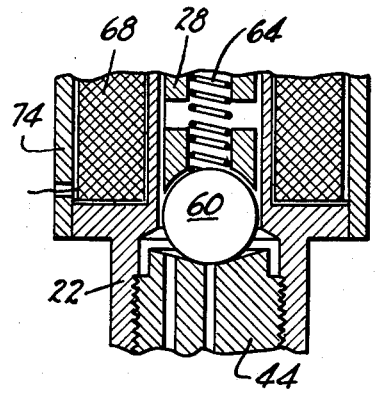
INVENTOR.
FRANKLIN O. WISMAN
BY
William N. Antonio
ATTORNEY

United States Patent Office 2,935,091
Patented May 3, 1960

2,935,091

SOLENOID VALVE

Franklin O. Wisman, South Bend, Ind., assignor to Bendix Aviation Corporation, South Bend, Ind., a corporation of Delaware Application July 16, 1956, Serial No. 597,923

7 Claims. (Cl. 137—623)

This invention relates to valves and more specifically to improvements in solenoid valves.

With ordinary single coil 3-way solenoid valves of the prior art, there is a tendency for direct spurt leakage to occur from pressure to return ports during the interval when the valves are shifting from one position to the other. The present invention relates to means for sequentially timing the valve elements by appropriate design of the magnetic circuit and core parts, thereby eliminating the customary spurt leakage defect.

It is therefore an object of this invention to provide a solenoid valve which utilizes a stepped and progressive leakage shunt section for coordinating and sequentially operating the valving elements.

An important object of this invention is to provide a solenoid valve which is simpler and more economical to construct.

Another object of this invention is to provide a solenoid valve utilizing armatures and valve elements which obviate concentricity and alignment problems.

A further object of this invention is to provide a solenoid valve utilizing spherical armatures.

A still further object of this invention is to provide a solenoid valve in which a spherical armature may also serve as a valving element.

The above and other objects and features of this invention will be apparent from the following description of the device taken in connection with the accompanying drawings which form a part of this specification, and in which:

Figure 1 is a vertical section of the solenoid valve shown in association with a hydraulic system, and Figure 2 is a partial section of a portion of the solenoid valve incorporating a spherical armature which also serves as the valving element.

Referring to Figure 1 of the drawings, the numeral 10 designates a solenoid valve incorporated in a hydraulic system which includes a power cylinder 12, a pump 14, a regulating valve 16, a reservoir 18, an accumulator 20, and the requisite pipe lines.

The solenoid valve includes a valve body 22 which serves as a first core having stepped and progressive leakage shunt sections 24 and 26. A second core 28 having a pole seat 30 formed on the end thereof is permanently connected to the valve body 22 and has bores 32, 34 and 36 formed therein. A copper slug 38 may be placed between the first and second cores for reasons to be subsequently explained. A first plug 40 having a return port 42 formed therein is connected to one end of the valve body 22. A second plug 44 having an inlet port 46, cylinder port 48, and a valve seat 50 is connected to the other end of the valve body. The first and second plugs are held in place by locking nuts 52 and 54.

A first spherical armature 56 having a spherical valve member 58 attached thereto by suitable means is located within the valve body so that the valve member 58 can seat on conical pole seat 30. A second spherical armature 60 having a spherical valve member 62 attached thereto by suitable means is located within the valve body so that the valve member 62 can seat on valve seat 50. A preloaded spring 64, located within bore 36, urges the armature 60 and valve member 62 against valve seat 50. Valve member 58 controls flow between the cylinder port 48 and return port 42 while valve member 62 controls flow between the inlet port 46 and the cylinder port 48.

A solenoid 66 controls the valve members 58 and 62 with respect to their seats 30 and 50 and comprises a coil winding 68, which encircles the shunt sections 24 and 26 of the core 22 and through which current is passed for establishing a magnetomotive force. The coil 68 is securely retained in position between shoulders 70 and 72 of the core 22 by an outer sleeve 74. The coil is suitably insulated by discs 76 and 78 and tape 80.

The described solenoid valve may be used to control devices such as automobile windshield wipers, hydraulic motors for convertible tops, etc. A cycling switch or other suitable switching means may be used to energize and de-energize the solenoid and in the case of a windshield wiper the switch would be so connected that at the end of the wiper stroke energization or de-energization would take place.

The shunts 24 and 26 are proportioned to insure the proper sequential operation between valve members 58 and 62. The upper thinner shunt 24 is designed as small as structural requirements permit. The lower thicker shunt 26 should be designed to saturate at the magnetic flux level required to hold valve member 58 on its seat 30 against the maximum system pressure. The spring 64 abutting the armature 60 is preloaded so that it can resist the maximum system pressure when the winding 68 is de-energized.

Before the solenoid is energized, the armature 56 and attached valve member 58 are freely movable within valve body 22 except for the insignificant effect of gravity thereon. Valve member 58 will permit flow of fluid from cylinder port 48 to return port 42 without any pressure drop of consequence. In the application illustrated it should be noted that fluid is never required to flow from return port 42 to the cylinder, hence it is not necessary to prevent the check valve action which will occur if return port 42 is in an upright position. For uses where bi-directional return port flow is required, a light antigravity spring may be inserted between the armature 56 and core 28. In any event the solenoid valve would not ordinarily be designed so that either the weight of the armature or the force required to overcome an anti-gravity spring, would be great enough to adversely affect the sequential operation of the device. The weight of the armature 56 and the forces exerted by such an anti-gravity spring would be very small compared to the magnetic forces developed.

Operation of the valve is as follows:

Prior to energization of the solenoid, the valve member 58 may be seated or unseated from seat 30 depending on the position of solenoid valve 10, while the valve member 62 is seated on valve seat 50 as a result of the force exerted by spring 64. When the solenoid is energized, the current builds up in the inductive circuit until enough flux is developed to draw and hold armature 56 and its associated valve member 58 against seat 30 with sufficient tractive force to resist the system pressure. Before armature 56 will be actuated it is necessary that the shunt section 24 reach its magnetic saturation value. Since the shunt section 26 has a greater cross-sectional area than shunt section 24 and therefore has a higher saturation value, and since spring 64 abuts armature 60, the armature 60 will require a greater total core flux for operation and will, therefore, be actuated at a time subsequent to the actuation of armature 56. Due to the actuation lag between the two armatures a predetermined sequential operation is provided between valve members 58 and 62. Thus upon energization of the solenoid, valve member 58 will be firmly held against valve seat 30 prior to the unseating of valve member 62.

Upon de-energization of the solenoid, armature 60 will be released prior to armature 56 because shunt 26 has a greater saturation value than shunt 24 and because of the force exerted by spring 64. Thus upon de-energization of the solenoid, valve member 62 is seated on valve seat 50 prior to the cessation of the magnetic forces holding valve member 58 firmly against valve seat 30. In some instances it may be desirable to use a copper slug 38, as shown in Figure 1, in order to provide a longer time interval in the sequential operation of the two valve members. The copper slug carries currents of induction which create a magnetomotive force, opposing decay of the main flux as the solenoid is de-energized. In effect, a secondary ring path is set up. In this manner a greater time interval is provided between the seating of valve member 62 and the magnetic release of valve member 58.

Looking at Figure 1, it will be seen that energization of the solenoid results in hydraulic communication between the inlet port 46 and cylinder port 48. However, this communication does not take place until communication is closed off between the cylinder port 48 and return port 42. It should be noted that the side of the piston having the smaller area is connected to pressure at all times while pressure on the larger area side is controlled by the solenoid valve 10. Thus when the solenoid is energized both sides of the piston will be subjected to the same pressure and the piston will move to the left. When the solenoid is de-energized the cylinder port 48 will communicate with the return port 42, but not before communication is cut-off between the inlet port 46 and cylinder port 48.

Novel spherical armatures are used in order to obviate problems of concentricity and misalignment. Furthermore a ball type armature would be cheaper to manufacture than other armature configurations. By using a small spherical valve member with the spherical armatures it is possible to use the device in high pressure systems where small seating areas are preferred. It should be noted that it is impossible to attach two spherical members together and fail to get them in alignment. Furthermore, it is not even necessary to attach the spherical members together if the conical valve seat dimensions are proportioned so that the smaller spherical element is retained within the conical walls.

Figure 2 shows a partial section of a modified solenoid device using a spherical member in a dual capacity, as both the valving element and as a solenoid armature or plunger. This type of dual capacity armature would function in an excellent fashion in low pressure systems and of course would further reduce the cost of solenoid valves.

The several practical advantages which flow from this solenoid valve are believed to be obvious from the above, and other advantages may suggest themselves to those who are familiar with the art to which this invention relates.

Having thus described the various features of the invention, what I claim as new and desire to secure by Letters Patent is:

1. A solenoid valve comprising a core assembly having a first core and a second core, said first core having a stepped and progressive leakage shunt section, said second core having a bore formed therein and a first valve seat formed at the end of said bore, a winding around said shunt section, a first plug connected to said first core, said first plug having a return port therein, a second plug connected to said first core, said second plug having inlet and cylinder ports therein, a second valve seat formed on said second plug, a first spherical armature located at one end of said second core, said armature having a spherical valve member affixed thereto for seating on said first valve seat, a second spherical armature located at the other end of said second core, said second armature having a spherical valve member affixed thereto for seating on said second valve seat, and spring means urging said second armature and valve member against said second valve seat.

2. A solenoid valve comprising a core assembly having a first core and a second core, said first core having a stepped and progressive leakage shunt section, said second core having a bore formed therein and a first valve seat formed at the end of said bore, a winding around said shunt section, a first plug connected to said first core, said first plug having a return port therein, a second plug connected to said first core, said second plug having inlet and cylinder ports therein, a second valve seat formed on said second plug, a first spherical armature located at one end of said second core, said armature being seatable on said first valve seat, a second spherical armature located at the other end of said second core, said second armature being seatable on said second valve seat, and spring means urging said second armature against said second valve seat.

3. A solenoid valve comprising a core assembly having a stepped and progressive leakage shunt section, a winding around said core assembly, an inlet port, a return port, and cylinder port, a first spherical armature within one end of said core assembly for controlling flow between the cylinder port and the return port, a second spherical armature within the other end of said core assembly for controlling flow between the inlet port and the cylinder port, said shunt section causing a predetermined sequential movement of said first and second armatures upon energization of said solenoid.

4. A solenoid valve comprising a core assembly having a stepped and progressive leakage shunt section, a winding around said core assembly, an inlet port, a return port, and cylinder port, a first armature within one end of said core assembly for controlling flow between the cylinder port and the return port, a second armature within the other end of said core assembly for controlling flow between the inlet port and the cylinder port, said shunt section causing a predetermined sequential movement of said first and second armatures upon energization of said solenoid.

5. A solenoid valve comprising a core assembly having a stepped and progressive leakage shunt section associated therewith, a plurality of ports, a plurality of armatures associated with said core assembly for controlling flow between said ports, said shunt section causing a predetermined sequential movement of said armatures upon energization of said solenoid.

6. A solenoid valve comprising a first valving element, a second valving element, and magnetic armatures having shunt core sections of unequal cross-sectional areas associated therewith for controlling movement of said first and second elements, said shunt sections being proportioned in accordance with the armature tractive force requirements to provide a timed and sequential operation of said first and second valving elements.

7. A solenoid valve comprising a valve body having a fixed leakage shunt section, said shunt section having a first thin portion and a second thick portion, a winding around said shunt section, an inlet port, return port, and cylinder port, a first armature controlling flow between said cylinder port and return port, and a second armature for controlling flow between said inlet port and said cylinder port.

References Cited in the file of this patent

UNITED STATES PATENTS

| | | |
|---|---|---|
| 1,817,592 | Sokeloff | Aug. 4, 1931 |
| 1,978,737 | Bower | Oct. 30, 1934 |
| 2,366,412 | Lambert | Jan. 2, 1945 |
| 2,419,908 | Mott | Apr. 29, 1947 |
| 2,473,038 | Rockwell | June 14, 1949 |
| 2,574,335 | Luduc | Nov. 6, 1951 |
| 2,644,426 | Moore | July 7, 1953 |
| 2,657,673 | Littlefield | Nov. 3, 1953 |